(12) United States Patent
Rash et al.

(10) Patent No.: US 7,734,101 B2
(45) Date of Patent: Jun. 8, 2010

(54) APPARATUS AND SYSTEM FOR TESTING AN IMAGE PRODUCED BY A HELMET-MOUNTED DISPLAY

(75) Inventors: Clarence E Rash, Enterprise, AL (US); Thomas H Harding, Enterprise, AL (US); Sheng-Jen Hsieh, College Station, TX (US); Howard H Beasley, Louisville, AL (US); John S Martin, Daleville, AL (US); Ronald W Reynolds, Bellwood, AL (US); Robert M. Dillard, Ozark, AL (US)

(73) Assignee: The United States of America as represented by the Secretary of the Army, Washington, DC (US)

(*) Notice: Subject to any disclaimer, the term of this patent is extended or adjusted under 35 U.S.C. 154(b) by 812 days.

(21) Appl. No.: 10/988,404

(22) Filed: Nov. 10, 2004

(65) Prior Publication Data

US 2006/0018550 A1    Jan. 26, 2006

Related U.S. Application Data

(63) Continuation of application No. 09/703,426, filed on Oct. 31, 2000, now abandoned.

(60) Provisional application No. 60/239,496, filed on Oct. 11, 2000.

(51) Int. Cl.
*G06K 9/62* (2006.01)
*G06K 9/68* (2006.01)

(52) U.S. Cl. ............... 382/209; 382/217; 382/219

(58) Field of Classification Search .......... 345/7, 345/8, 9; 348/65, 73, 76, 53
See application file for complete search history.

(56) References Cited

U.S. PATENT DOCUMENTS 5,836,869 A * 11/1998 Kudo et al. ............. 600/173

(Continued)

FOREIGN PATENT DOCUMENTS

WO    WO-01/22149    3/2001

OTHER PUBLICATIONS

Thomas et al., "Optical and Biodynamic Evaluation of the Helmet Integrated Display Sight System (HIDSS) for the RAH-66 Comanche Development and Validation Program Phase", U.S. Army Aeromedical Research Laboratory, Mar. 1998.

(Continued)

*Primary Examiner*—Brian Q Le
(74) *Attorney, Agent, or Firm*—Elizabeth Arwine

(57) ABSTRACT

The present invention relates to a system and method for allowing quality of an image to be tested. For example, the present invention may be utilized to test the quality of an image produced by a helmet-mounted display such as an Integrated Helmet and Display Sighting System (IHADSS). In at least one embodiment, after the image is captured by a camera, for example, at least one measurable aspect of the image is analyzed in an objective manner to determine at least one possible difference in the measurable aspect of the image and a corresponding measurable aspect of a recalled representation of the image and presenting the difference via a visual display device.

19 Claims, 12 Drawing Sheets

U.S. PATENT DOCUMENTS 5,841,409 A    11/1998    Ishibashi et al.
5,987,015 A    11/1999    Matui

OTHER PUBLICATIONS

Thomas et al., "Physical Evaluation of the Integrated Helmet and Display Sighting System (IHADSS) Helmet Display Unit (HDU)", U.S. Army Aeromedical Research Laboratory, Aug. 1995.

Victor et al., "The Effect of Helmet Mounted Display Field-of-View Configurations on Target Acquisition", U.S. Army Aeromedical Research Laboratory, Sep. 1999.

USAARL Report No. 2000-08, "Preliminary Design of an Image Quality Tester for Helmet-Mounted Displays", Sheng-Jen Hsieh, Clarence E. Rash, Thomas H. Harding, Howard H. Beasley, and John S. Martin; © Nov. 1999.

* cited by examiner

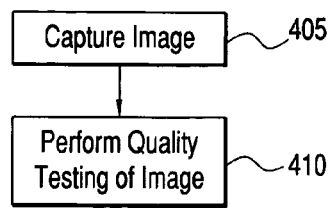
FIG.4
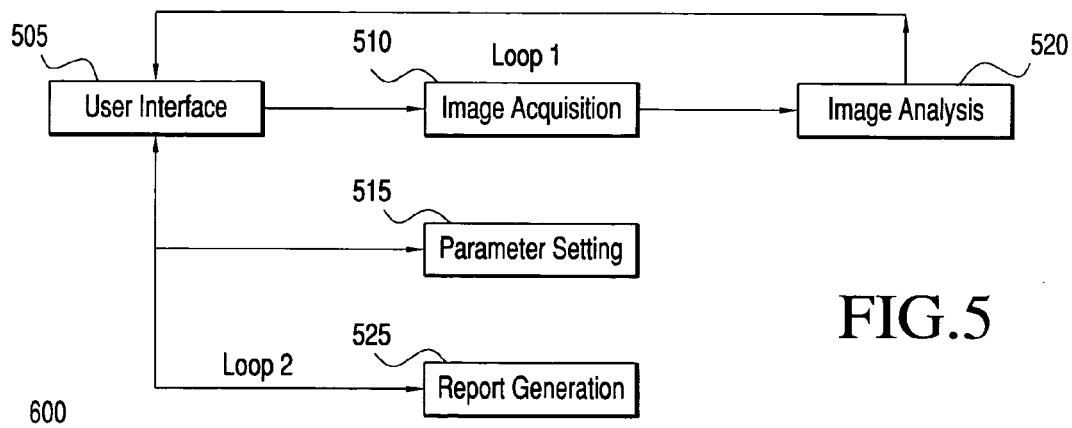
FIG.5
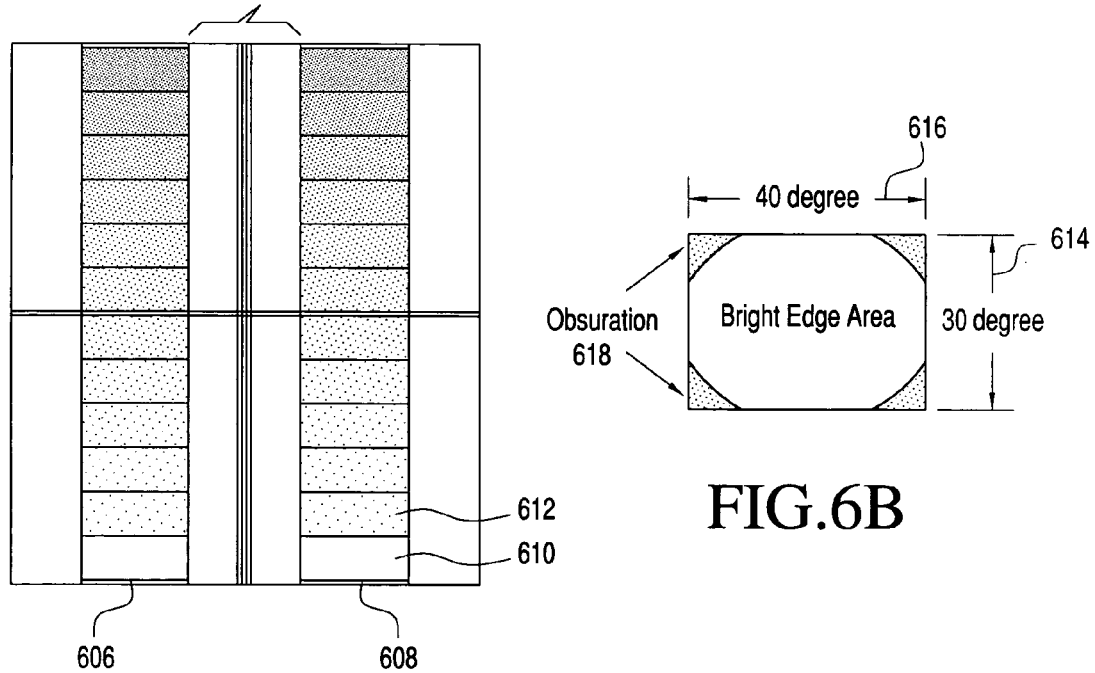
FIG.6A
FIG.6B

APPARATUS AND SYSTEM FOR TESTING AN IMAGE PRODUCED BY A HELMET-MOUNTED DISPLAY

This application is a continuation of U.S. patent application Ser. No. 09/703,426, filed on Oct. 31, 2000, which claims the benefit of U.S. provisional application Ser. No. 60/239, 496, filed on Oct. 11, 2000. Each of the foregoing applications is incorporated herein by reference.

I. FIELD OF THE INVENTION

The present invention relates generally to helmet-mounted displays and more particularly to testing quality and accuracy of images produced by helmet-mounted displays.

II. BACKGROUND OF THE INVENTION

Helmet-mounted displays (HMDs), in general, are systems which allow their operators, for example, pilots, battle tank operators, firefighters and others to integrate themselves with their environment. HMDs will generally have one or more unique features depending upon the environment in which they are deployed. One feature which an HMD may have is the capability to allow a human to see beyond the limitations of normal human vision, for example, forward looking infrared radar (FLIR) systems, (which use infrared waves which ordinarily cannot be seen by the human), radar and image intensification, to construct and project a picture which a human pilot, for example, can see. HMDs may also be integrated with helicopter weapons control (for example, integrated such that the visual display of the HMD is integrated with the gun sights of weapons on a helicopter).

One example of an HMD is the Integrated Helmet and Display Sighting system (IHADSS), manufactured by Honeywell, Inc. and used in the U.S. Army's AH-64 Apache helicopter. (For ease of understanding, the present discussion will refer throughout to the IHADSS, but it will be recognized by those having ordinary skill in the art that the IHADSS is intended to be representative of the more general HMDs above.)

The IHADSS typically gathers information related to the terrain and environment in which the aircraft is operating by using cameras and/or sensors affixed to the aircraft. Thereafter, the IHADSS processes the gathered information into a form which can be seen by a human pilot, and thereafter projects the gathered and processed information as images via an assortment of electronic and optical apparatuses (described in more detail below) into a pilot's field of view. In many instances, a pilot of an aircraft is flying the aircraft or targeting the aircraft's weapons systems on the basis of the images displayed by the IHADSS. Accordingly, it is imperative that each individual IHADSS project a clear and accurate depiction of the terrain and/or environment captured by its associated cameras and sensors. Consequently, it is important that the images produced by the IHADSS be clear and accurate. Unfortunately, the integration of each individual IHADSS with the systems and subsystems of aircrafts in which each individual IHADSS is deployed makes it difficult to ensure that each individual IHADSS is projecting a clear, accurate, and quality depiction of the terrains and/or environments (via produced images) captured by its associated cameras and sensors. This difficulty is due in large part to a lack of effective methods and systems for the testing of the accuracy and quality of IHADSS imagery in a field environment.

At present, when an IHADSS is deployed in a field environment, the accuracy and quality of the deployed IHADSS imagery is determined on a subjective basis by each pilot viewing the IHADSS' display device. Such a methodology is suboptimal for several reasons. One reason why such methodology is suboptimal arises from interaction of the gradual degradation of the IHADSS with the adaptability of the human visual system. Over time it is common for the visual displays of IHADSS to gradually degrade and become distorted for various reasons, for example, aging of the electronics, routine wear and tear, shock and vibration, etc. It has been discovered that in practice, an IHADSS display can be substantially degraded without such degradation being detectable by the pilot, because insofar as each IHADSS is typically tuned by a specific pilot, and insofar as the degradation of the IHADSS over time is often gradual, the adaptability of the human visual system often tricks the pilot into thinking the IHADSS display is accurate and/or acceptable when in fact it is substantially inaccurate and/or unacceptable. Another reason why the current methodology is suboptimal arises from the lack of accuracy and/or reproducibility generally associated with subjective approaches.

In light of the foregoing, it is clear that a need exists for a method and system for objectively and accurately testing the quality of images produced by an individual IHADSS.

III. SUMMARY OF THE INVENTION

The present invention relates to a system and method for testing the quality of an image produced by a helmet-mounted display (HMD). For example, the present invention may be utilized to test the quality of an image produced by a display sighting system such as the Integrated Helmet and Display Sighting System (IHADSS) used by pilots of helicopters or firemen blinded by a fire. In at least one embodiment, after an image is captured, for example, at least one measurable aspect of the image is analyzed in an objective manner to determine at least one possible difference in the measurable aspect of the image and a corresponding measurable aspect of a reference image and presenting the difference on a visual display device. The analyzing process may be accomplished by employing a variety of computational algorithms to aid in the above-referenced difference determination. Such a determination may aid a pilot in allowing the pilot to have a more accurate representation of his surrounding environment, thereby reducing risk to the pilot's life.

IV. BRIEF DESCRIPTION OF THE DRAWINGS

The use of cross-hatching or shading within these drawings should not be interpreted as a limitation on the potential materials used for construction. Like reference numerals in the figures represent and refer to the same element or function.

FIG. 4 illustrates a block diagram of a method for objectively testing quality of an image according to at least one embodiment of the invention.

FIG. 5 illustrates program modules of the system according to at least one embodiment of the invention.

FIG. 6A illustrates an exemplary test pattern image on which the method of the present invention may be performed to test the quality of the image according to at least one embodiment of the invention.

FIG. 6B illustrates display size of an exemplary test pattern image according to at least one embodiment of the invention.

V. DETAILED DESCRIPTION OF THE DRAWINGS

Figure 1:
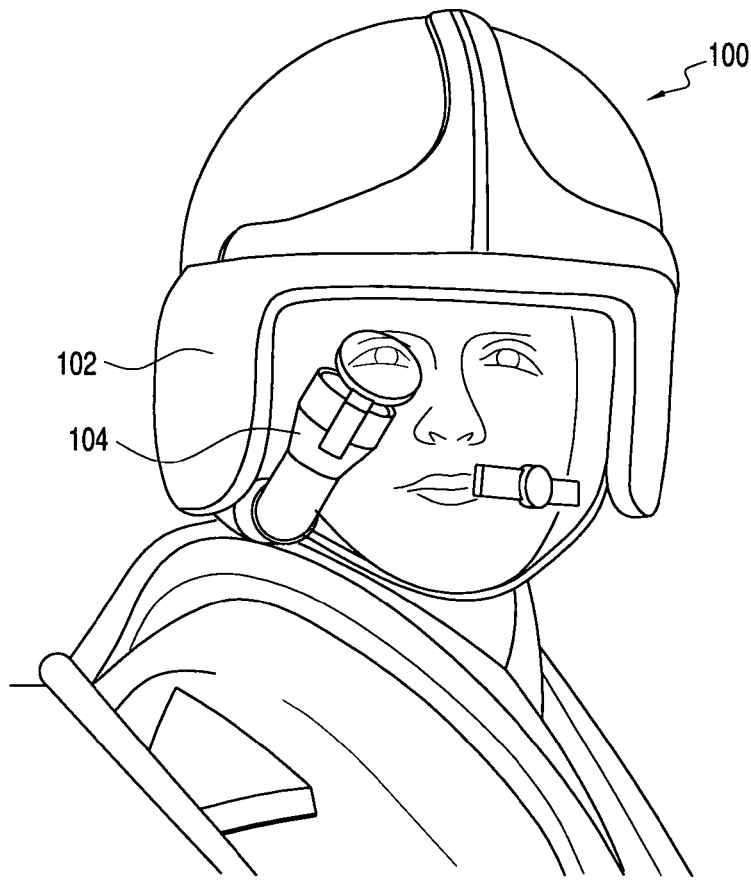
FIG. 1 illustrates a perspective view of a pilot wearing an Integrated Helmet Unit (IHU) according to at least one embodiment of the invention.
Figure 2:
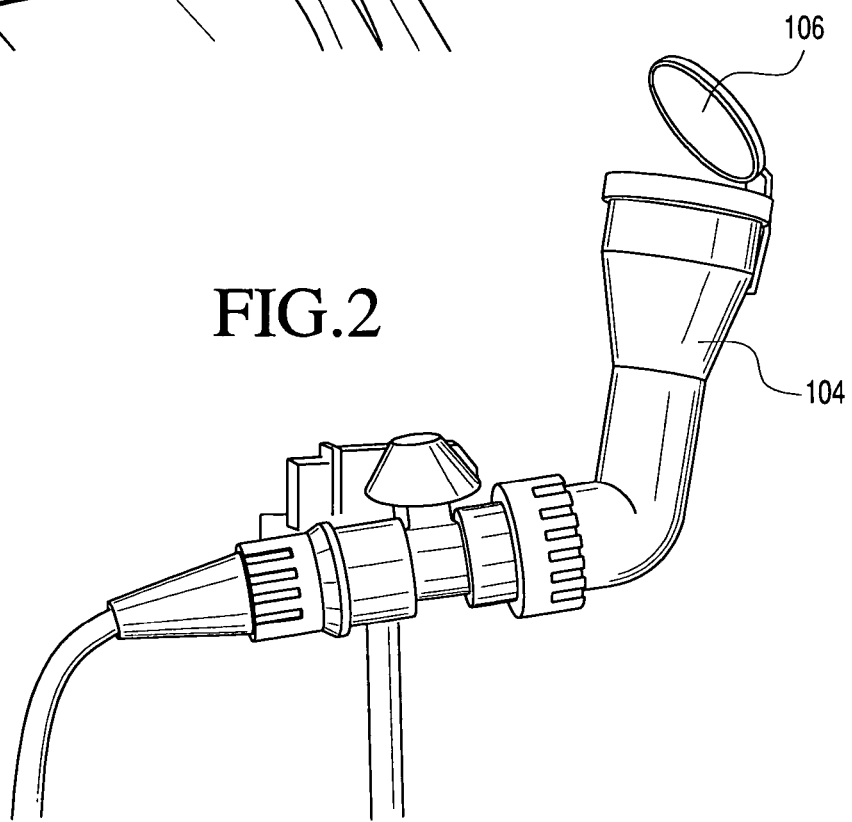
FIG. 2 illustrates a perspective view of a Helmet Display Unit (HDU).

The present invention may be employed to test the quality of an image produced by helmet mounted displays (HMDs). Such displays may be employed in a variety of environments, for example, by vehicle operators for viewing pilotage and fire control imagery, by firefighters, by aircraft mechanics, and by factory workers, etc. In Army aviation, for instance, the AH-64 Apache helicopter presently employs an HMD system known as the Integrated Helmet and Display Sighting System (IHADSS), available from Honeywell Inc., of Gardena Calif. The HMD with which the present invention is utilized typically includes various electronic components and a helmet display system known as the Integrated Helmet Unit (IHU). The IHU typically includes a Helmet Display Unit (HDU). For example, as shown in FIG. 1, pilot 100 is wearing IHU 102. IHU 102 includes HDU 104. As shown in FIG. 2, HDU 104 serves as an optical relay device which conveys an image formed on a mini-CRT, for example, through a series of lenses, off beamsplitter (combiner) 106, and into one of the pilot's eyes. The mini-CRT and lenses are internal to the HDU 104 and hence are not shown explicitly in FIG. 2. Combiner 106 is so named because its construction allows pilot 100 to see whatever image is projected from HDU 104 superimposed, or combined with, whatever pilot 100 can see through combiner 106. In effect, the combiner 106 functions as a mirror with respect to the projection of the mini-CRT within HDU 104, and a lens with respect to allowing pilot 100 to see what is in front of him. That is, if one looks closely at FIG. 1, one can see that pilot 100's eye is visible through combiner 106, which means that pilot can see through combiner 106. Consequently, what pilot 100 sees will be a combination of the projection of HDU 104 and what appears in front of pilot 100.

As pilots rely on the imagery information including pilotage, navigation and fire control imagery produced by the HDU 104, it is important for an image produced by the HDU to be accurate and optimal, that is, not degraded. Thus, the present invention provides a system and method for testing the quality and accuracy of such images produced by the HDU, as will be described in more detail herein below.

Figure 3A:
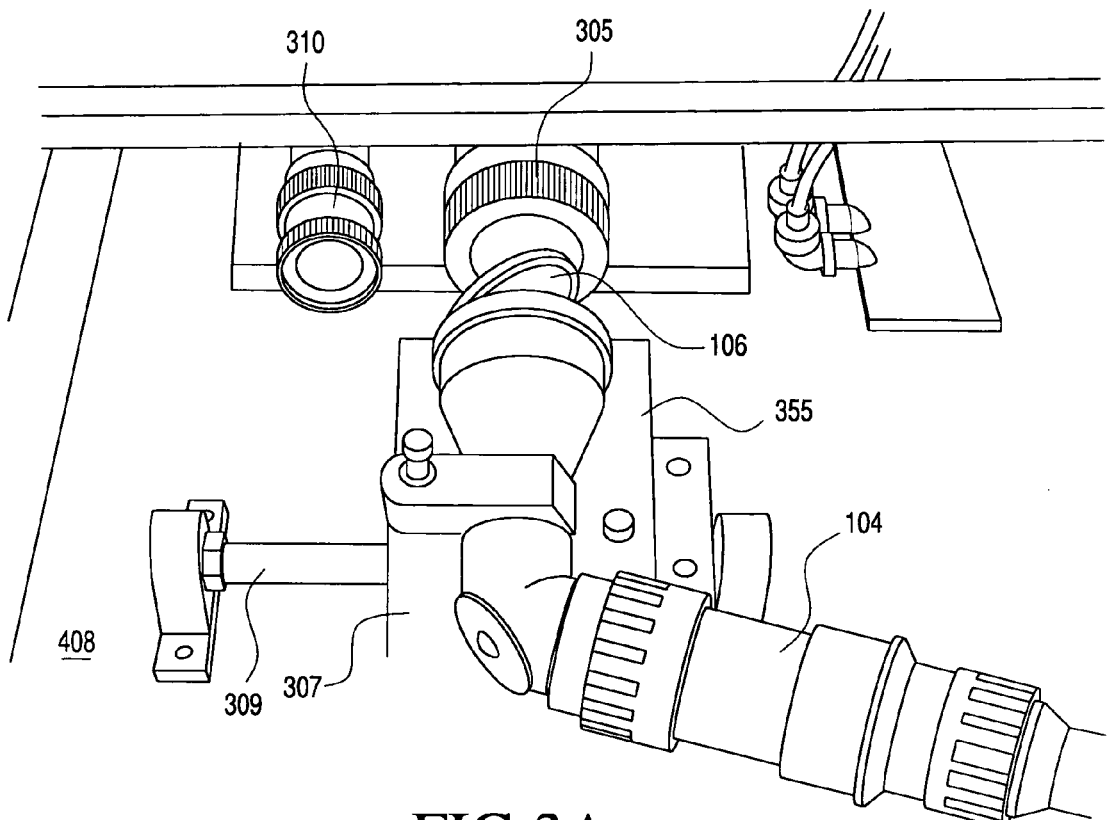
FIG. 3A illustrates a perspective view of a positioning device in which the HDU is placed to capture an image for testing according to at least one embodiment of the invention.
Figure 3B:
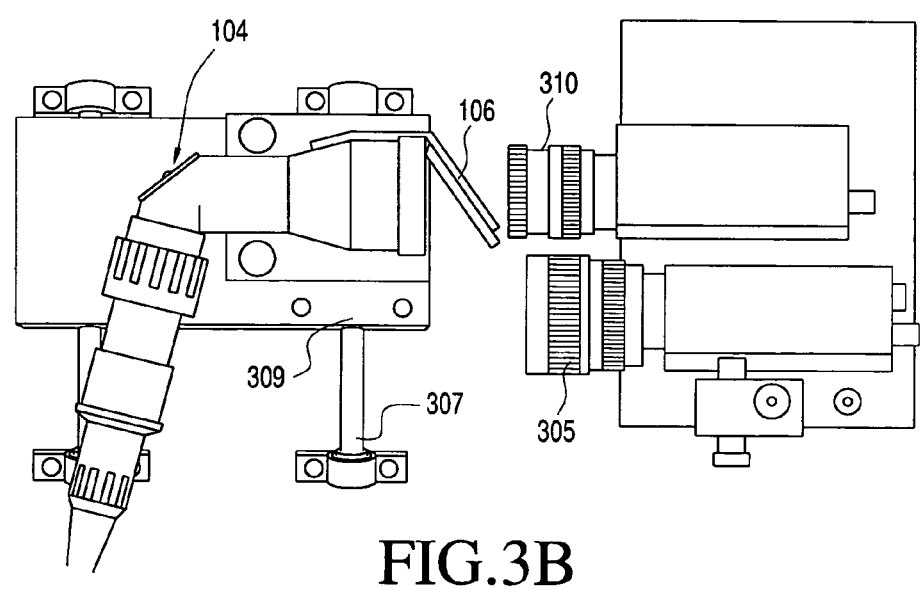
FIG. 3B illustrates a perspective view of the positioning device in conjunction with cameras used to capture an image for testing according to at least one embodiment of the invention.

Before the image is tested by the present invention, the image is preferably captured. For example, as shown in the exemplary embodiments of FIGS. 3A and 3B, one or more cameras may be used to capture the image. In particular, in at least one embodiment of the invention, both a wide-angled camera 305 and a narrow-angled camera 310 are utilized to capture the image. In such an embodiment, as shown in FIG. 3A, the HMD preferably switches between a first position 307 for capturing the image with the wide angled camera 305 and a second position 309 for capturing the image with the narrow-angled camera 310.

As shown in FIG. 4, a high-level flow diagram of the testing procedure in accordance with an exemplary embodiment of the invention, in step 405, a test pattern image is captured (using the cameras 305 and 310 shown in FIGS. 3A and 3B, for example), and in step 310, the quality of the captured image is objectively and accurately tested. In at least one embodiment, after capturing the image by a camera, the invention employs a variety of computational algorithms to test the quality of the image by measuring various aspects of the captured image and comparing them to a stored representation of the image.

For example, in at least one embodiment, quality testing of the image includes analyzing at least one measurable aspect of the image in an objective manner to determine at least one possible difference in the measurable aspect of the image and a corresponding measurable aspect of a recalled representation of the image. The above-referenced difference is preferably presented via a visual display device. In at least one embodiment, the recalled representation of the image is theoretically displayed (for example, displayed in memory). In at least one embodiment, the system of the invention includes a first module for analyzing at least one measurable aspect of the image in an objective manner, a second module for comparing the at least one measurable aspect of the image with a corresponding at least one measurable aspect of a recalled representation of the image to determine at least one difference in the image and the recalled representation of the image from the comparison, and a third module for presenting the difference via a visual display device.

In at least one embodiment of the present invention, the system for testing quality of the test pattern image includes a functional component having modules such as computer program modules. The modules are preferably executed on a controller. For example, a workstation or computer such as a desktop computer, a laptop computer, palmtop computer, or personal digital assistant (PDA) or the like may serve as a controller in the present invention. Exemplary workstations or computers used to implement the invention include, but are not limited to, Apple®, Sun Microsystems®, IBM®, or IBM®-compatible personal computers, and Dell® Computers. In view of this disclosure, however, those skilled in the relevant art will realize that the system may also be in the form of firmware. In accordance with an embodiment of the invention, the computer program modules of the present invention may be stored in main memory and/or secondary memory.

In at least one embodiment, the computer program modules of the present invention include computer readable instructions. One skilled in the art will recognize that the computer readable instructions included in the computer program modules of the present invention can be in the form of any viable computer programming language. For example, a high-level programming language such as C, C++, Ada, LISP, Cobol, Fortran, or Beginners All-Purpose Symbolic Instruction Code (BASIC), and/or Visual Basic can be utilized to program the program modules of the present invention. It should be noted that the term "module," "program module," or "computer program module" is used herein to refer to a set of computer instructions for accomplishing a task. Thus, as used herein, a program module may be embodied in a single electronic file or medium or in multiple files or media.

In addition to being implemented in software or firmware, the functional component of the invention may be implemented primarily in hardware using, for example, hardware components such as application specific integrated circuits (ASICs). Implementation of a hardware state machine so as to perform the functions described herein will be apparent to persons skilled in the art after being provided with the description herein.

As illustrated in FIG. 5, the functional component for performing quality testing of an image is shown (that is, the functional component for performing steps 405 and 410 is shown). In at least one embodiment of the present invention, the functional component includes a user interface computer program module 505, an image acquisition program module 510, a parameter setting program module 515, an image analysis module 520, and a report generation module 525. The functions of each module will be described herein.

In at least one embodiment, the user interface computer program module 505 may be present. The user interface computer program module 505 preferably allows navigation from one module to another. For example, in at least one embodiment, the user interface module provides control buttons and message box functions for providing navigation instructions.

The image acquisition module 510 preferably allows the user to capture the test pattern image. In at least one embodiment, the module includes a first submodule for activating an image capture card and a second submodule for digitizing the video signal into a graphics image format such as a bitmap or jpeg format. After being presented with the disclosure herein, those skilled in the relevant art will realize that the image capture card may be a data acquisition card such as DAQ-Card-DIO-24, manufactured by National Instruments, Corporation, of Austin, Tex. In at least one embodiment, the image capture card is fitted into a computer's PCMCIA slot, for example. The data acquisition card may be interposed between a narrow-angle or wide-angle camera and a portable computer system. After being presented with the disclosure herein, those skilled in the relevant art will also realize that a variety of image capture card drivers may be utilized with the image capture card. For example, an image capture interface module may provide an image format with a 780×510 pixel resolution and may be launched by object-linked embedding (OLE) techniques.

The parameter setting program module 515 preferably allows the user to set or adjust values for system parameters such as image resolution, password access, module functionality (that is, image capture module settings), selection of which modules should run in the background or foreground, and the extent of detail for reported results. For example, system engineers may wish to know image-processing results on a rather frequent basis, whereas maintenance technicians may only be interested in final inspection results.

The image analysis module 520 preferably processes, analyzes, and detects features of the captured image. For example, as shown in FIG. 6A, test pattern image 600, which is preferably built-in with the IHADSS, has two portions in at least one embodiment of the invention. Wide angle portion 602, which is preferably captured by a wide-angled camera, is co-extensive with the test pattern image 600. Narrow-angle portion 604, which is preferably captured by a narrow-angled camera, is denoted in FIG. 600 as the small rectangular portion substantially between the gray-scale strips 606 and 608. Each of the gray-scale strips 606 and 608 includes approximately eight to ten shades of gray, depending upon the contrast ratio. Adjacent shades (for example, 610 and 612) have a square root of two differential of luminance. As shown in FIG. 6B, the size of the image fits within a 30-degree vertical 614 and 40-degree horizontal 616 field of view (FOV). Corner obscuration 618 is permissible and symmetrical, as illustrated in FIG. 6B.

It should be noted that the function of the image analysis module is to identify features present in the captured test pattern image. For example, the "Sober operator," a well known edge detection technique, is used to identify the boundaries of the features and thereby, allow the image analysis module to determine whether or not the required features are present in the captured test pattern image.

In at least one embodiment of the invention, there are two separate image analysis modules. In such an embodiment, one of the image analysis modules processes the image captured by the narrow-angle camera, and the other image analysis module processes the image captured by the wide-angle camera. Computational algorithms employed by the image analysis module 520 will now be described further herein.

After the image analysis module 520 has been completed, in at least one embodiment, the report generation module 525 is executed. In such an embodiment, the report generation module 525 preferably displays results of the image analysis module 520 in files with filenames corresponding to the time and date that the particular image was captured. For example, in at least one embodiment, there are two files, one for the narrow-angle camera image and the other for the wide-angle camera image. The contents of these two files are merged and displayed in a text box.

As shown in FIG. 5, in at least one embodiment, on a first sequential pass, (that is, loop 1 in FIG. 5) the user interface module 505 is executed, followed by the image acquisition module 510 for image capture by the narrow-angled camera, then finally followed by the image analysis module 520 to perform quality and accuracy testing of the image captured by the narrow-angled camera. In a second sequential pass (that is, loop 2 in FIG. 5), the user interface module 505 is executed, followed by the image acquisition module 510 for image capture by the wide-angled camera, then finally followed by the image analysis module 520 to perform quality and accuracy testing of the image captured by the wide-angled camera. The report generation module 525 is preferably executed to generate a report of the image quality and accuracy testing process. It should be noted that the system preferably allows system parameters to be set or adjusted by executing the parameter setting module at the beginning of the image analysis process performed by the image analysis module 520. It should also be noted that in at least one embodiment, the image may be first captured by the wide-angled camera and subsequently captured by the narrow-angled camera.

Figure 7:
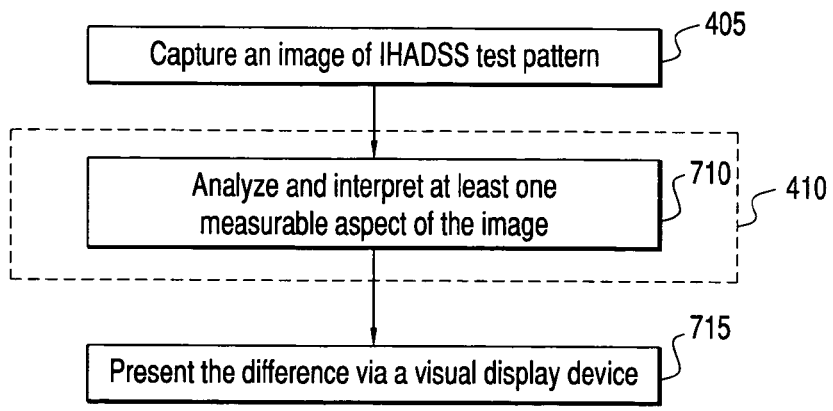
FIG. 7 illustrates a lower-level overview of the method displayed in FIG. 4 according to at least one embodiment of the invention.

As shown in FIG. 7, a low-level depiction of FIG. 4, in at least one embodiment of the invention, after the image (for example, the test pattern image illustrated in FIG. 6A) is captured in step 405, in step 710, at least one measurable aspect of the image is analyzed in an objective manner to determine at least one possible difference in the measurable aspect of the image and a corresponding measurable aspect of a recalled representation of the image. For example, in at least one embodiment of the invention, a representation of how the image should appear if it has been displayed accurately is stored in computer memory.

In step 715, if a difference is detected, then it is presented (for example, a report is generated and provided). It should be noted that in at least one embodiment of the invention, the recalled representation of the image includes a test pattern having at least one vertical line or at least one horizontal line.

Figure 8A:
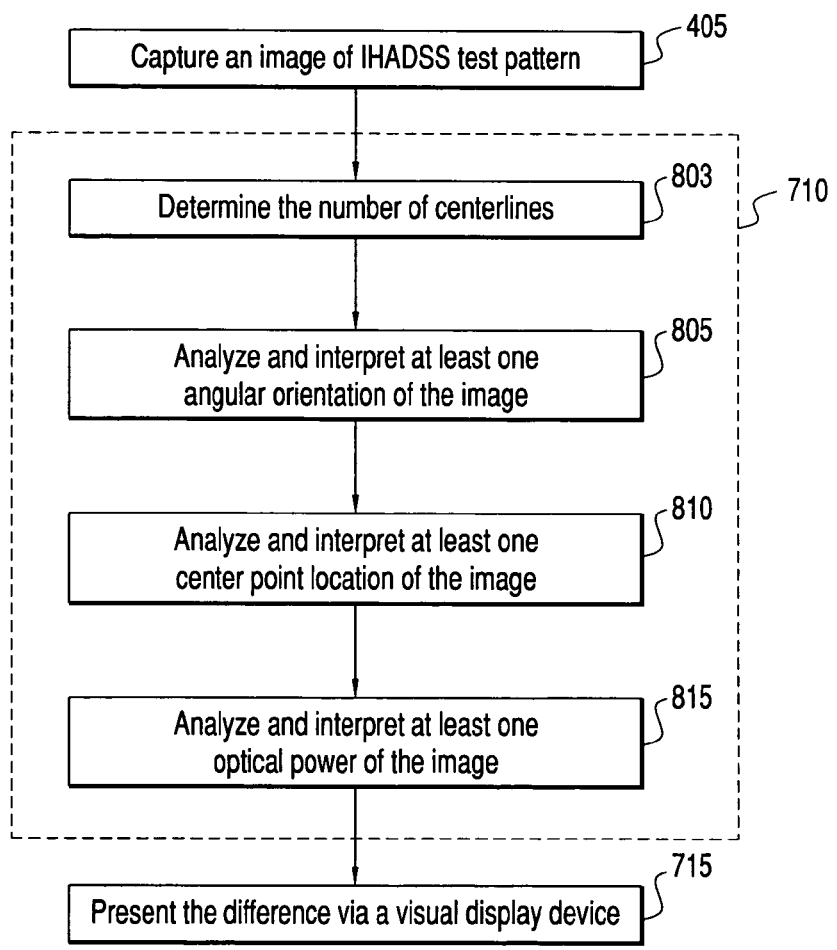
FIG. 8A illustrates a more detailed view of the method depicted in FIG. 7 according to at least one embodiment of the invention.

In FIG. 8A, a specific implementation of the method displayed in FIG. 7, in step 803, the number of center lines is identified. In step 805, at least one angular orientation of the image is analyzed in an objective manner to determine at least one possible difference in the angular orientation and a corresponding angular orientation in a recalled representation of the image.

In step 810, at least one center point location of the image is analyzed in an objective manner to determine at least one possible difference in the center point location and a corresponding center point location in the recalled representation of the image.

In step 815, at least one optical power of the image is analyzed in an objective manner to determine at least one possible difference in the focus and a corresponding focus in a recalled representation of the image. It should be noted that in at least one embodiment, a sole one of steps 805, 810, or 815 may be executed and the difference presented via a visual display.

Figure 8B:
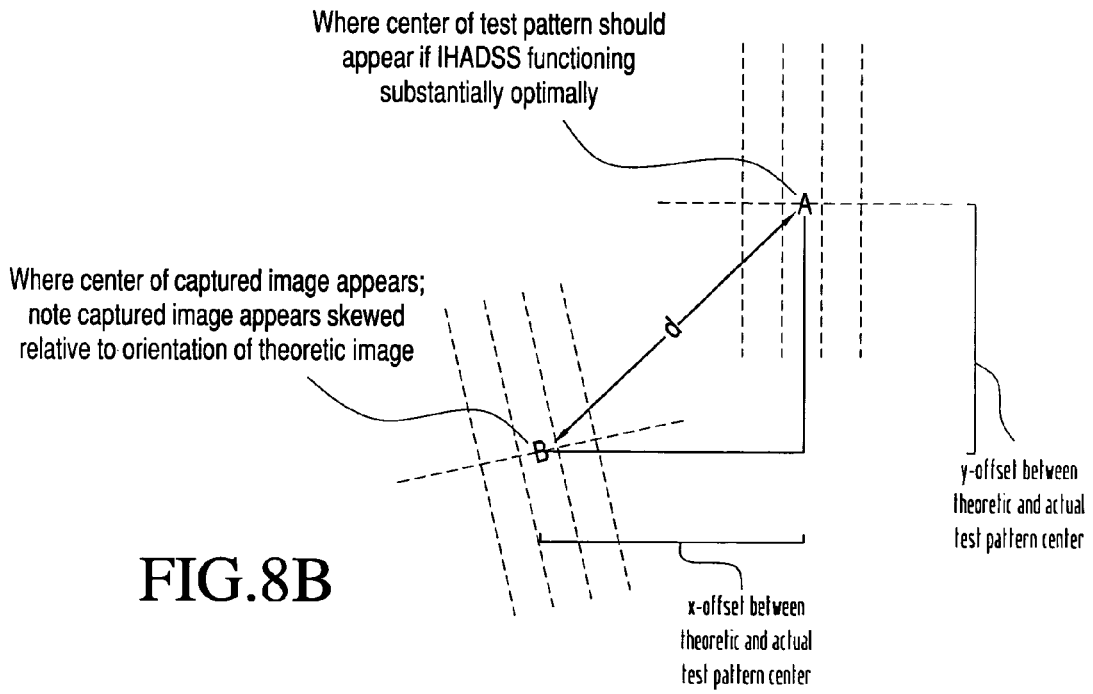
FIGS. 8B-8C illustrate a pictographic representation of the methodology used by one implementation to compute the centering difference and the angular difference according to at least one embodiment of the invention.

In FIG. 8B, a pictorial representation of the methodology used by one implementation of the invention to determine the centering difference in method step 810 of FIG. 8A is illustrated. As shown in FIG. 8B, the center point of the actual image captured (point "B") can be compared with where the center point should be if the IHADSS were functioning substantially optimally (for example, point "A," which is obtained from the recalled representation of the image theoretically displayed via the display sighting system), and the resulting x-y displacement can be used to compute the distance d, between actual and theoretical center point locations (for example, the x-y units can be any unit of length, but in one embodiment the x-y units are millimeters).

Figure 8C:
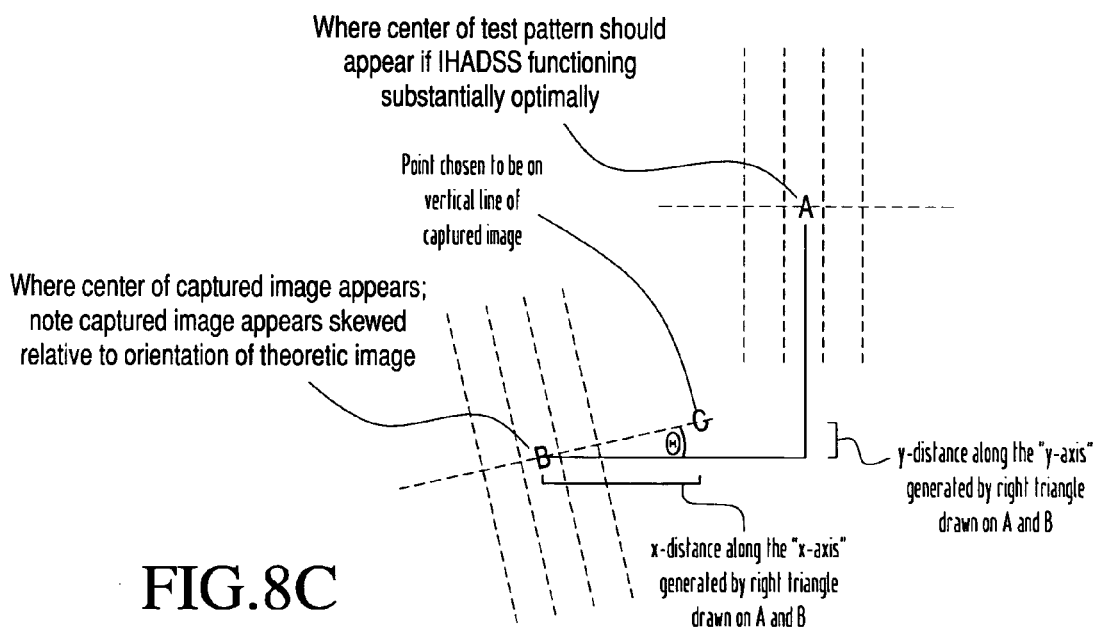

As shown in FIG. 8C, a right triangle drawing on the x-y position relative to points A and B can be used in combination with a point chosen to be on the "vertical" line of captured narrow-angle portion 604 of IHADSS test pattern 600 in FIG. 6A in order to calculate θ (theta) as the orientation difference between the captured image orientation and the recalled representation of the image.

Figure 8D:
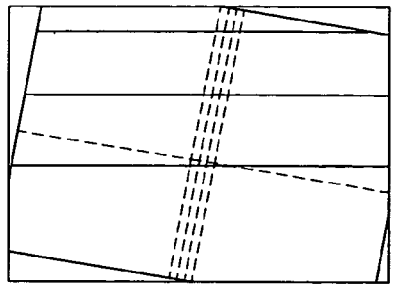
FIGS. 8D-8H illustrate images after a binary process has been applied according to at least one embodiment of the invention.
Figure 8E:
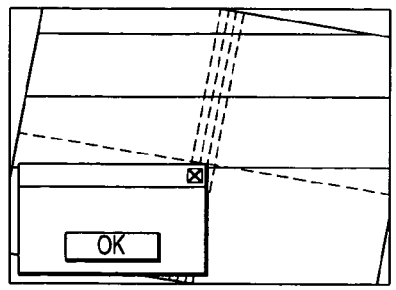
Figure 8F:
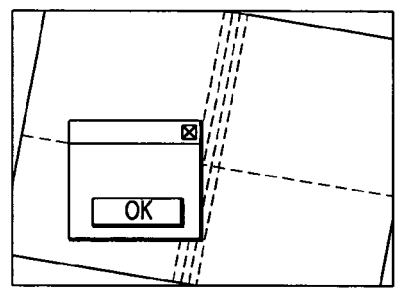
Figure 8G:
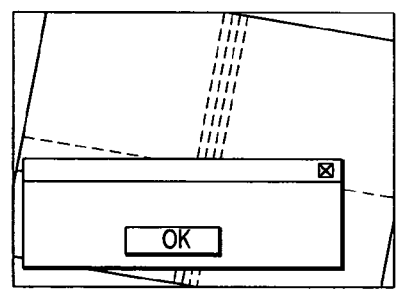

In one embodiment of the invention, method steps 805, 810, and 815 are performed by converting the captured narrow-angle portion of the image to binary form and recalling the representation of how the narrow-angle portion (for example, 604 in FIG. 6A) should appear if displayed substantially optimally. As shown in FIGS. 8D-8G, exemplary graphical displays of the image after binary processing has been accomplished are displayed. In particular, FIG. 8D shows a binary image of the test pattern after the binary image technique had been applied to the test pattern captured from the HMD. FIG. 8E shows the four center lines that were identified from the binary image of FIG. 8D. After the center lines are identified, the image analysis module preferably identifies the center point of the image. As shown in FIG. 8F, the coordinates (y-axis only) of the center point of the image are shown. The image analysis module then determined whether the image was tilted. As shown in FIG. 8G, the tilt angle of the image is shown. It should be noted that the tilt represents what the captured image would look like IF the imagery is not vertically aligned. The invention assumes a misalignment exists and measures it.

Figure 8H:
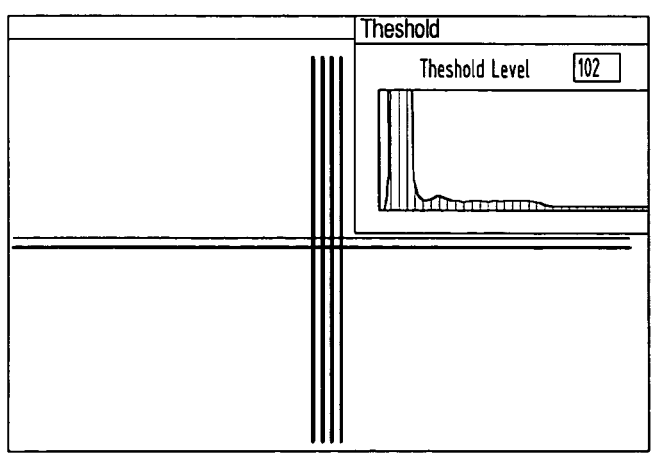

As used herein, converting to binary form means creating a two-color image, where all captured image pixels having a number below a calculated threshold are set to gray level 0 (pure black) and all captured image pixels above a calculated threshold are set to gray level 255 (pure white in a system with 0-255 gray levels). FIG. 8H presents another illustration of the image after it has been processed in binary form with the captured image pixels having a number below a calculated threshold.

Figure 8I:
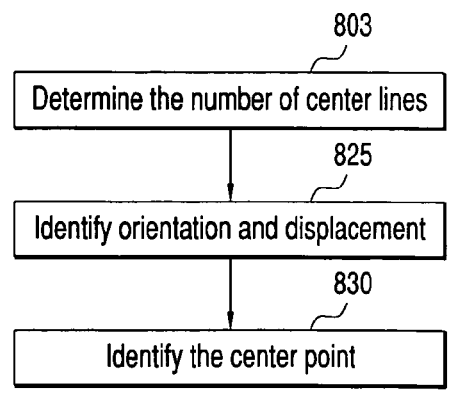
FIG. 8I illustrates an exemplary implementation of the method shown in FIG. 8A according to at least one embodiment of the invention.

FIG. 8I is an exemplary implementation of the method shown in FIG. 8A. In step 825, a specific implementation of step 805 of FIG. 8A, the orientation and displacement of the image are identified. In step 830, a specific implementation of step 810 of FIG. 8A, the center point of the image is identified.

Figure 8J:
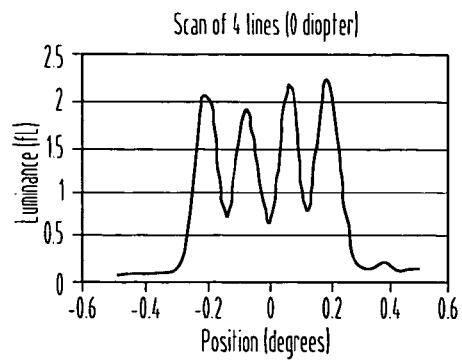
FIG. 8J illustrates measurement of luminance of the center lines of a tested image according to at least one embodiment of the invention.
Figure 8K:
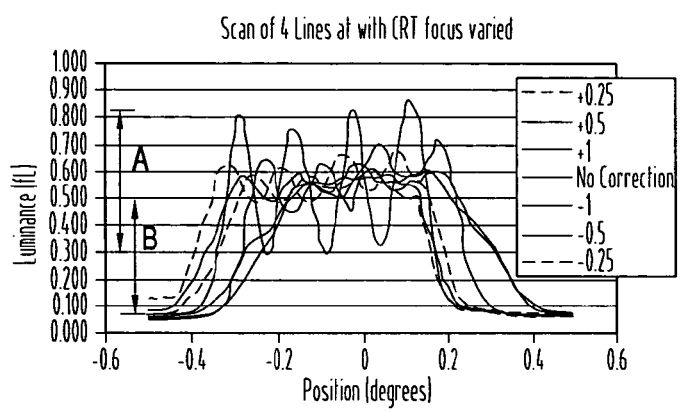
FIGS. 8K-8L illustrate measurement of the center lines with varied focus according to at least one embodiment of the invention.
Figure 8L:
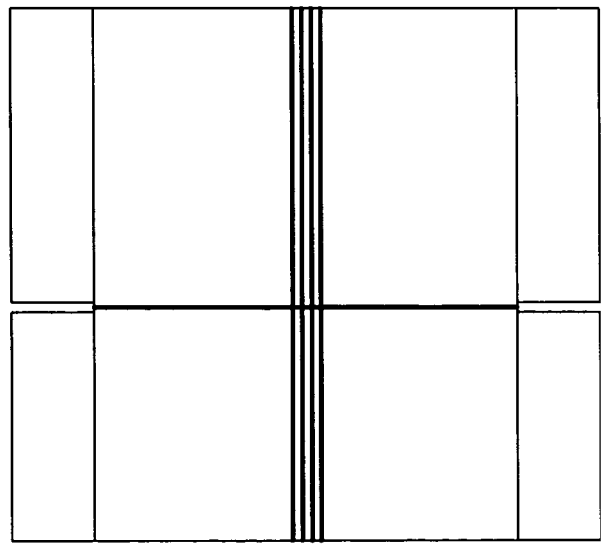

It should be noted that each center line identified in step 803 of FIG. 8A has a luminance measurement of FIG. 8I has a luminance measurement. For example, as shown in FIG. 8J, the center line located at 0.4 degrees has a luminance measurement of approximately 0.3 luminance. As shown in FIGS. 8K and 8L, each center line also includes a varied focus.

Figure 8M:
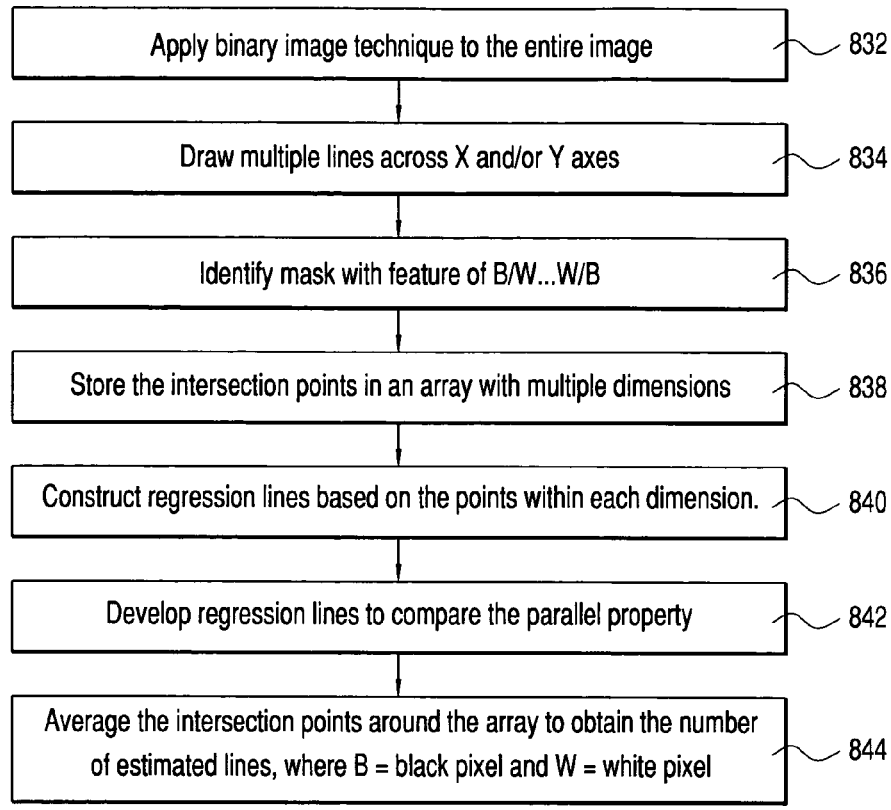
FIG. 8M illustrates an exemplary implementation of step 803 of FIG. 8I according to at least one embodiment of the invention.

FIG. 8M illustrates an exemplary method for step 803 of FIG. 8I, identifying the number of center lines. In step 832, a binary image technique is applied to the entire image. In step 834, multiple lines are drawn across X and/or Y axes of the image. In step 836, the mask with feature of B/W . . . W/B (where B is the black pixel and W is the white pixel) is identified. In step 838, the intersection points are stored in an array with multiple dimensions. In step 840, regression lines based on the points within each dimension are constructed. In step 842, regression lines are developed to compare the parallel property. In step 844, the intersection points around the array are averaged to obtain the number of estimated lines.

Figure 8N:
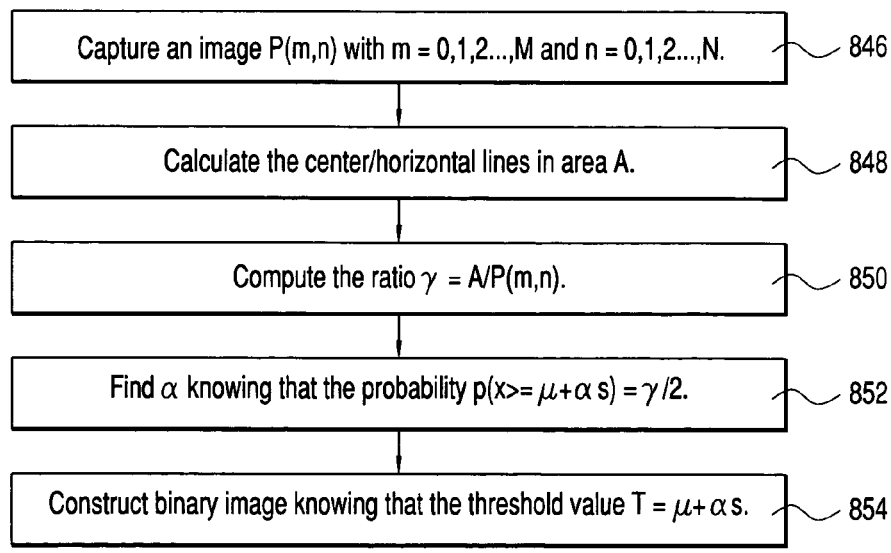
FIG. 8N illustrates an exemplary method for discovering the threshold value needed to conduct a binary image process of a tested image according to at least one embodiment of the invention.

FIG. 8N illustrates an exemplary method for discovering the threshold value needed to conduct the binary image process of step 832 in FIG. 8M. In step 846, an image P(m,n) is provided with m=0,1,2 . . . , M and n=0,1,2 . . . , N (for example, an image P(m,n) where m=0, . . . , 780 and n=0, . . . 510. In step 848, the center/horizontal lines in area A are calculated (for example, center area A is approximate to H+V−O, where H: horizontal line, V: four vertical lines, O: center overlap region; measurements are H=54×485, V=758×10, O=54×12, and A=33122. In step 850, the ratio γ=A/P(m, n) is computed (for example, γ=A/P(m,n)=33122/(780*510)=0.0832. In step 852, α is computed, given that the probability p (x>=μ+αs)=γ/2 (for example, p(x>=μ+αs)=0.0416, where μ=24.14, s=29.67; therefore, α=2.652. In step 854, a binary image is constructed, given that the threshold value T=μ+αs (for example, T=102.82, based on steps 1-4). μ is the mean and s is the standard deviation of the gray level of the image. γ represents the percentage of the center four-line region relative to the overall image area. The center four lines are the ones that have a higher gray level than the rest of the background; γ/2 will provide a better contrast of the center four-line area.

Figure 8O:
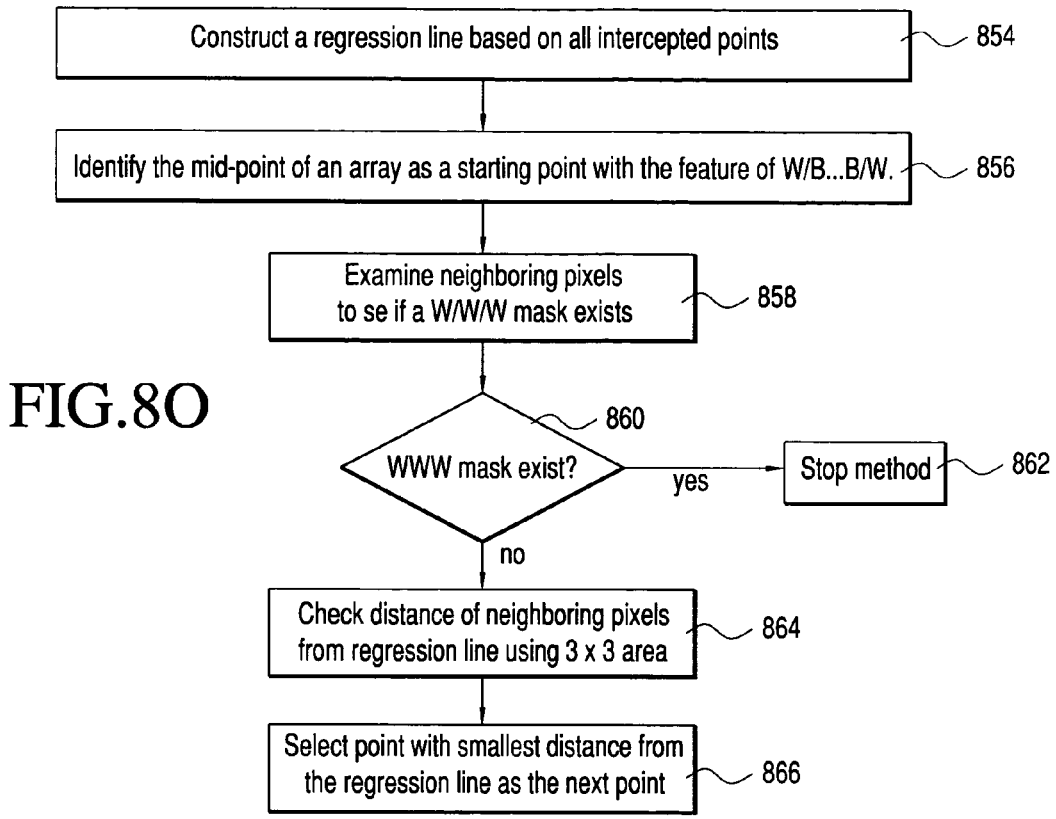
FIG. 8O illustrates an exemplary implementation of step 830 of FIG. 8I according to at least one embodiment of the invention.

FIG. 8O illustrates an exemplary method for step 830 of FIG. 8I, identifying the center point. In step 854, a regression line based on all intercepted points of the image is constructed, thereby forming a black line perpendicular to the horizontal line.

In step 856, the mid-point of an array is identified as a starting point with the feature of W/B . . . B/W. In step 858, neighboring pixels are examined to see if a W/W/W mask exists. In decision step 860, it is determined whether the WWW mask exists. If the WWW mask exists, the method is stopped in step 862. Returning to decision step 860, if the WWW mask does not exist, the distance of the neighboring pixels from the regression line is checked using a 3×3 area in step 864. In step 866, the point with the smallest distance from the regression line is selected as the next point.

Figure 8P:
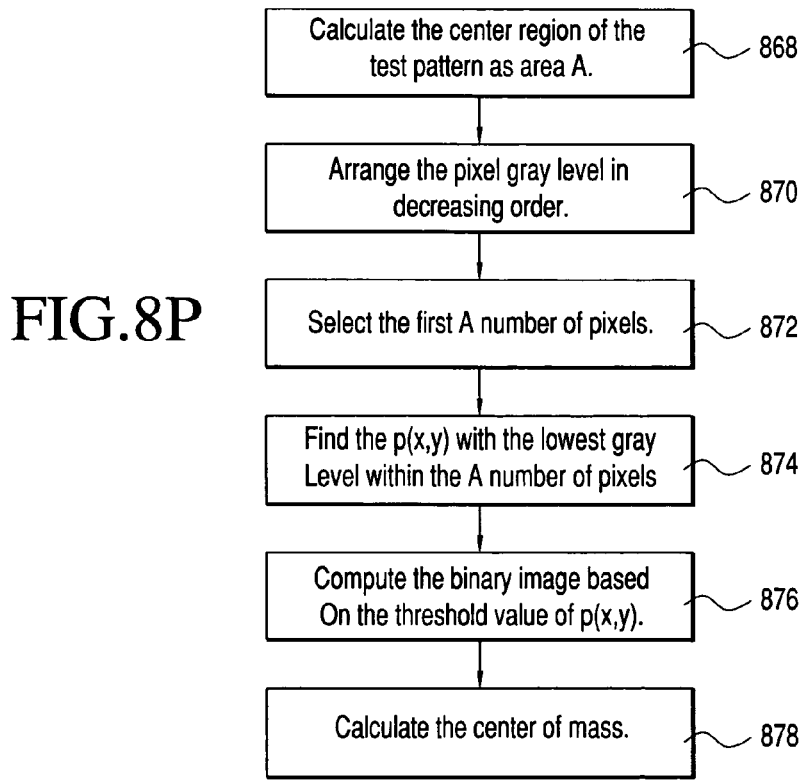
FIG. 8P illustrates an exemplary alternative implementation of step 830 of FIG. 8I according to at least one embodiment of the invention.

FIG. 8P illustrates an alternative exemplary method for step 830 of FIG. 8I, identifying the center point. In step 868, the center region of the test pattern is calculated as area A. In step 870, the pixel gray level is arranged in decreasing order. In step 872, the first A number of pixels is selected. In step 874, the p(x,y) with the lowest gray level within the A number of pixels is determined. In step 876, the binary image is computed based on the threshold value of p(x,y). In step 878, the center of mass is calculated. In at least one embodiment, the following equations are used to calculate the center of mass: Center_X=Σ Xi/A; Center_Y=Σ Yi/A. It should be noted that when the alternative exemplary method illustrated in FIG. 8P is utilized, no noises that have the same gray level as the pixels within region A should be present.

After being presented with the disclosure herein, those skilled in the relevant art will realize that a variety of other methods may be employed for identifying the center point. For example, instead of using the mask referenced in step 858 in FIG. 8O above, the following mask may be utilized:

b b b b
bwwwwwb
b b b b

Alternatively, the center point may be identified by first finding the center point of each line of the image and then using an averaging method to find the center of all the center points. Finally, as another alternative, the center point may be identified by identifying the boundary of the image and using a center of gravity method to find the center of the image.

Figure 8Q:
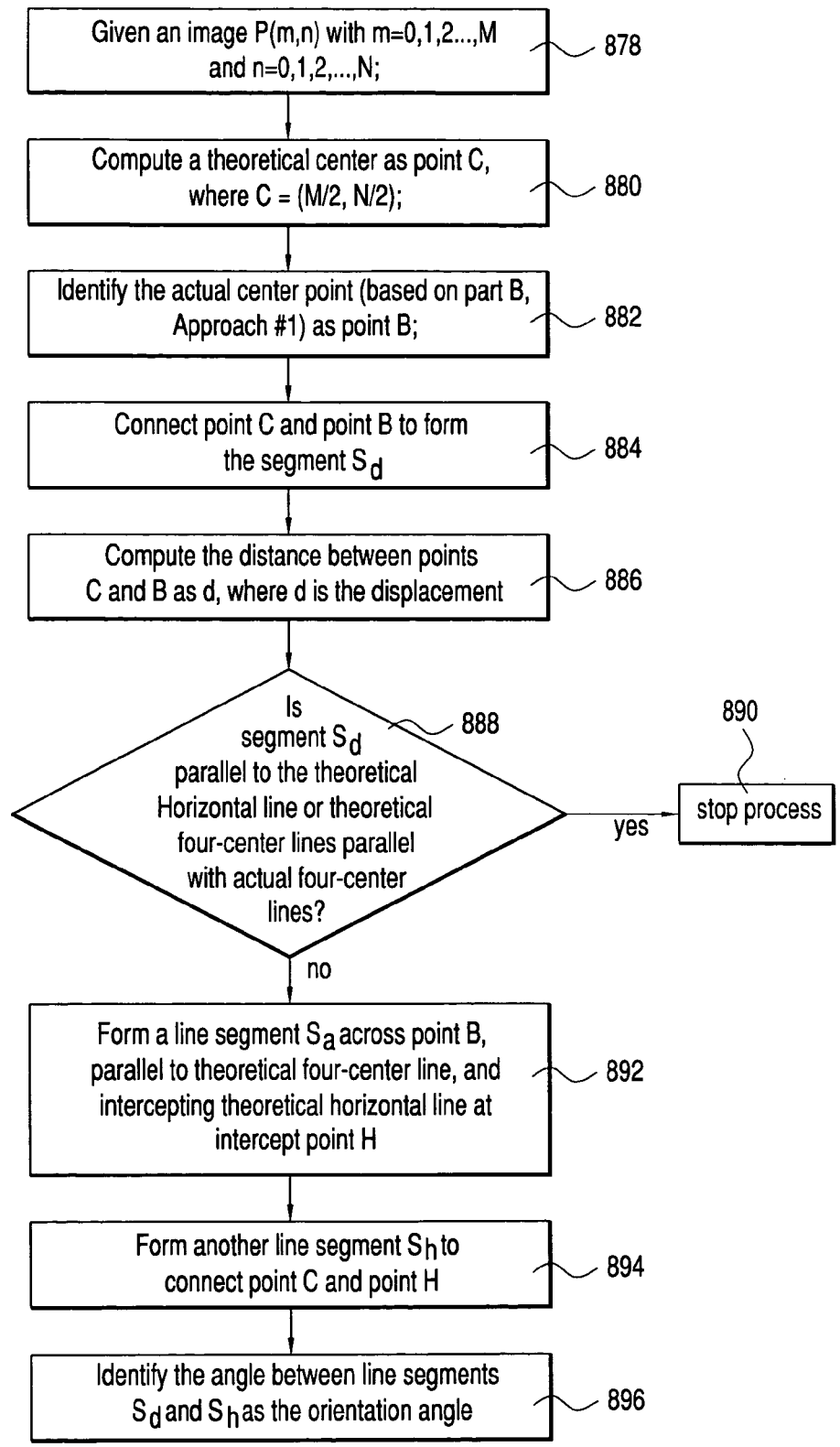
FIG. 8Q illustrates an exemplary implementation of step 825 of FIG. 8I according to at least one embodiment of the invention.

FIG. 8Q illustrates an exemplary method for step 825 of FIG. 8I, identifying the test pattern orientation and displacement. In step 878, an image P(m,n) with m=0,1,2 . . . , M and n=0,1,2, . . . , N, is provided. In step 880, a theoretical center is computed as point C, where C=(M/2,N/2). In step 882, the actual center point is identified as point B. In step 884, points B and C are connected to form the segment $S_d$. In step 886, the distance between points C and B is computed as d, where d is the displacement. In decision step 888, it is determined whether segment $S_d$ is parallel to the theoretical horizontal line or if the theoretical four-center lines are parallel with the actual four-center lines.

In decision step 888, if it has been determined that either segment $S_d$ is parallel to the theoretical horizontal line or that the theoretical four-center lines are parallel with the actual four-center lines, then the method is stopped in step 890, as the orientation angle is 0. Returning to decision step 888; if segment $S_d$ is not parallel to the theoretical horizontal line and the theoretical four-center lines are not parallel with the actual four-center lines, then control resumes with step 892.

In step 892, a line segment $S_a$ is formed across point B, parallel to the theoretical four-center line and intercepting the theoretical horizontal line at an intercept point H.

In step 894, another line segment $S_h$ is formed to connect point C and point H. Finally, in step 896, the angle between the line segments $S_d$ and $S_h$ is identified as the orientation angle.

Figure 9A:
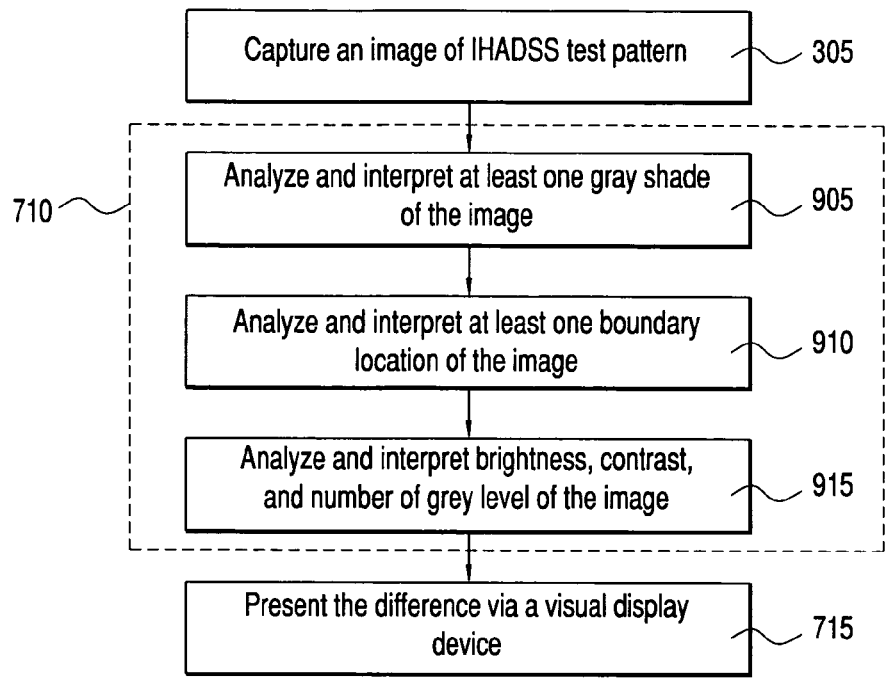
FIG. 9A illustrates an alternative detailed implementation of the method depicted in FIG. 7 according to at least one embodiment of the invention.

In FIG. 9A, an alternative implementation of the step 710 displayed in FIG. 7, in step 905, at least one gray shade of the image is analyzed in an objective manner to determine at least one possible difference in the at least one gray shade of the image and a corresponding gray shade in a recalled representation of the image.

In step 910, at least one boundary location of the image is analyzed in an objective manner to determine at least one possible difference in at least one field-of-view of the image and a corresponding field-of-view in the recalled representation of the image.

In step 915, brightness, contrast, and number of gray levels of the image are analyzed in an objective manner to determine at least one possible difference in an image quality figure of merit of the image and a corresponding image quality figure of merit in the recalled representation of the image. It should be noted that in at least one embodiment, a sole one of steps 905, 910, and 915 may be executed and the difference presented via a visual display device.

Figure 9B:
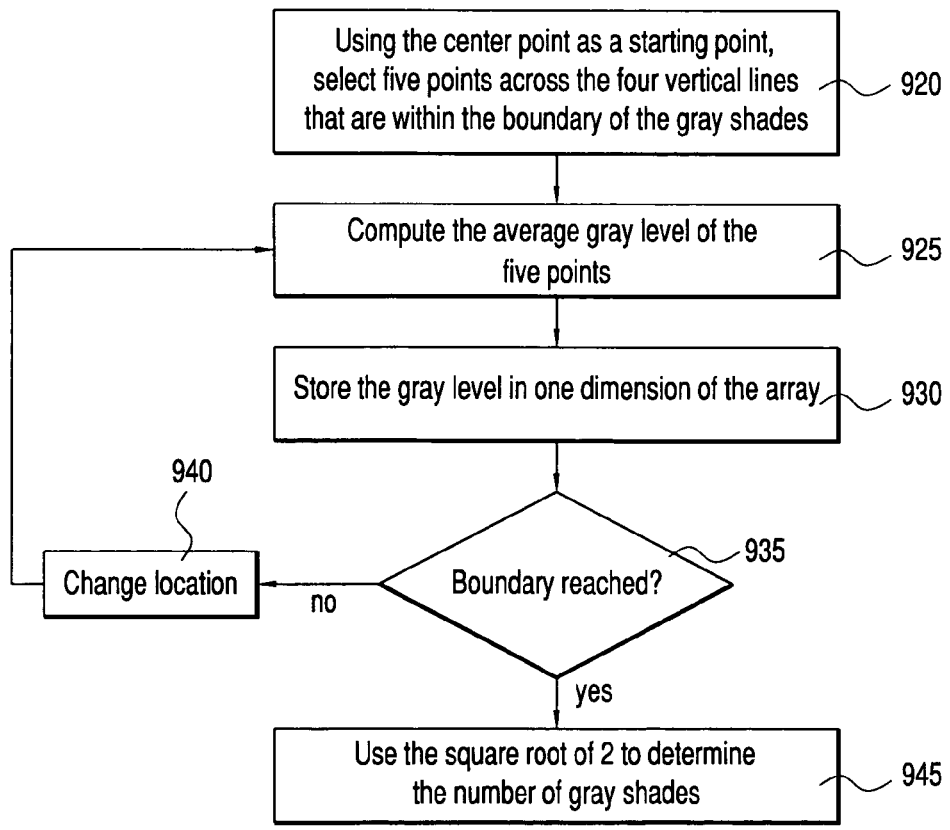
FIG. 9B illustrates a specific implementation of step 905 of FIG. 9A according to at least one embodiment of the invention.

In FIG. 9B, a specific implementation of step 905 of FIG. 9A, in step 920, using the center point as a starting point, five points are selected across the four vertical lines that are within the boundary of the gray shades. As the loop shown in steps 925-940 is repeated, the average luminance of multiple gray patterns, that is, gray levels, encountered as the image is scanned up or down is stored. At the end of the loop, the lowest and highest measured luminance values are used to calculate the number of square-root-of-two gray levels using the equation:

Number of gray levels=[log($C_r$)/log($\sqrt{2}$)]+1, where $C_r$ is the contrast ratio defined as $L_{Max}/L_{Min}$, where these luminances are the lowest and highest found in the above-referenced loop shown in FIG. 9B.

In step 925, the average gray level of the five points are computed. In step 930, the average gray level computed in step 925 is stored in one dimension of an array. In decision step 935, it is determined whether the boundary has been reached. If the boundary has not been reached, location is changed up or down to a given distance in step 940 and control resumes with step 925, where the average gray level of the five points is again computed. Returning to decision step 935, if it is determined that the boundary has been reached, the square root of 2 is used to determine the number of gray shades (that is, gray levels) in step 945, as described in the equation presented above.

Figure 9C:
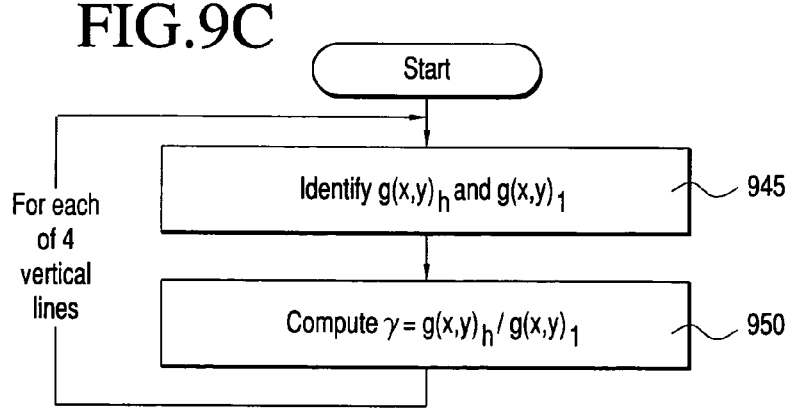
FIG. 9C illustrates an alternative implementation of step 905 of FIG. 9A according to at least one embodiment of the invention.

In FIG. 9C, an alternative implementation of step 905 of FIG. 9A, in step 945, $g(x,y)_h$ and $g(x,y)_1$ are identified. In step

950, the ratio $\gamma = g(x,y)_h/g(x,y)_1$ is computed. As shown in FIG. 9C, steps 945 and 950 are repeated for the four vertical lines and gray shade regions, where $g(x,y)_h$ represents the pixel p(x,y) with the highest gray level, and $g(x,y)_1$ represents the pixel p(x,y) with the lowest gray level.

Figure 9D:
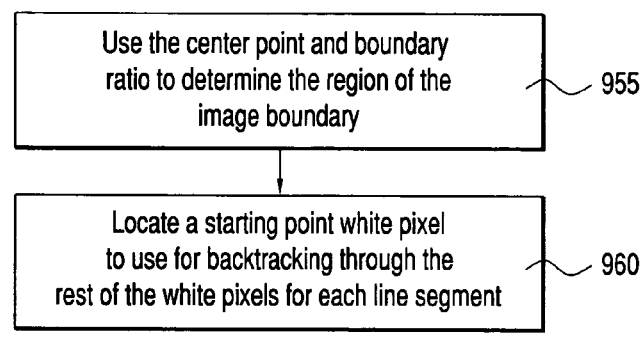
FIG. 9D illustrates a specific implementation of step 910 of FIG. 9A according to at least one embodiment of the invention.

FIG. 9D illustrates a specific implementation of step 910 in FIG. 9A. In step 955, the center point and boundary ratio are used to determine the region of the image boundary. In step 960, a starting point white pixel is located to use for backtracking through the remainder of the white pixels for each line segment.

Figure 9E:
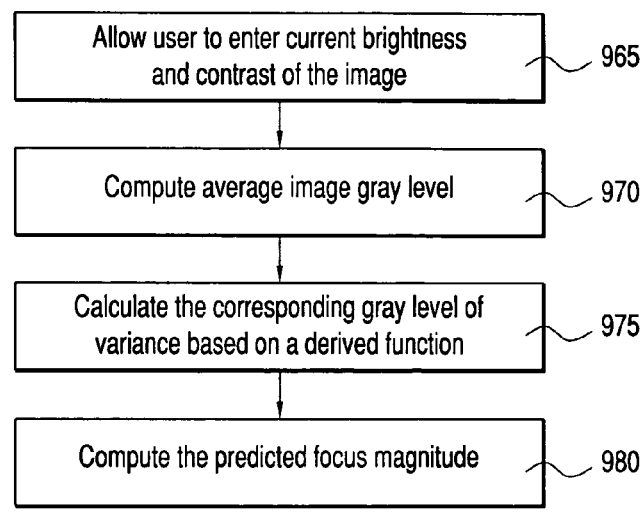
FIG. 9E illustrates a specific implementation of step 915 of FIG. 9A according to at least one embodiment of the invention.

FIG. 9E illustrates a specific implementation of step 915 in FIG. 9A. In step 965, a user is allowed to enter the current brightness and contrast of the image. In step 970, the system of the invention computes the average image gray level. In step 975, the system calculates the corresponding gray level of variance based on a derived function. In step 980, the system computes the predicted focus magnitude.

It should be noted that the accuracy of the image analysis program module may be verified by utilizing a language debugging tool. After being presented with the disclosure herein, those of ordinary skill in the relevant art will also realize that split-half and back tracking strategies may also be imposed throughout the coding process. The program module results may also be compared with simulation results. For example, to check the accuracy of the constructed regression line, the same data points also were analyzed and compared with the results obtained from a statistics package and hand calculation.

The term computer program product as used herein generally refers to media such as a computer program medium or a computer usable medium. A removable storage drive, a hard disk installed in a hard disk drive, a computer diskette, a cd, and signals are examples of computer program media and serve as means for providing software to a workstation. In other words, a computer program product is a product on which a module (for example, a computer program module) of the present invention may be stored for execution.

Those skilled in the art will appreciate that various adaptations and modifications of the above-described embodiments can be configured without departing from the scope and spirit of the present invention. Therefore, it is to be understood that, within the scope of the appended claims, the invention may be practiced and constructed other than as specifically described herein.

We claim:

1. A method for testing quality of an image produced by a display sighting system, comprising:
   using a computer to perform the following:
   analyzing at least one measurable aspect of the image in an objective manner to determine at least one difference in said measurable aspect of the image and a corresponding measurable aspect of a recalled representation of the image; and
   presenting said difference via a visual display device.

2. The method of claim 1, wherein said recalled representation of the image is theoretically displayed.

3. The method of claim 1, further comprising, before said analyzing step, capturing the image with at least one camera.

4. The method of claim 3, wherein said analyzing step includes analyzing at least one angular orientation of the image in an objective manner to determine at least one possible difference in the angular orientation and a corresponding angular orientation in a recalled representation of the image.

5. The method of claim 4, wherein said analyzing step further includes analyzing at least one center point location of the image in an objective manner to determine at least one possible difference in the center point location and a corresponding center point location in the recalled representation of the image.

6. The method of claim 5, wherein said analyzing further includes analyzing at least one optical power of the image in an objective manner to determine at least one possible difference in the focus and a corresponding focus in a recalled representation of the image.

7. The method of claim 4, wherein said analyzing step further includes determining a number of center lines.

8. The method of claim 5, wherein the recalled representation of the image includes a test pattern having at least one vertical line.

9. The method of claim 6, wherein the recalled representation of the image includes a test pattern having at least one horizontal line.

10. The method of claim 3, wherein said analyzing step includes analyzing at least one gray shade of the image in an objective manner to determine at least one possible difference in the at least one gray shade of the image and a corresponding gray shade in a recalled representation of the image.

11. The method of claim 10 wherein said analyzing step further includes analyzing at least one boundary location of the image in an objective manner to determine at least one possible difference in at least one field-of-view of the image and a corresponding field-of-view in the recalled representation of the image.

12. The method of claim 11, wherein said analyzing step further includes analyzing brightness, contrast, and number of gray levels of the image in an objective manner to determine at least one possible difference in an image quality figure of merit of the image and a corresponding image quality figure of merit in the recalled representation of the image.

13. The method of claim 3, wherein said capturing includes capturing the image via a data acquisition card interposed between a narrow-angle camera and a portable computer system.

14. The method of claim 13, wherein said capturing further includes capturing the image via a data acquisition card interposed between a wide-angle camera and the portable computer system.

15. A system for testing an image produced by a display sighting system, comprising:
   a computer to execute a first module for analyzing at least one measurable aspect of the image in an objective manner;
   a computer to execute a second module for comparing the at least one measurable aspect of the image with a corresponding at least one measurable aspect of a recalled representation of the image to determine at least one difference in the image and the recalled representation of the image from the comparison; and
   a computer to execute a third module for presenting said difference via a visual display device.

16. A computer-readable medium having computer executable instructions for performing the method of claim 1.

17. A computer-readable medium having computer executable instructions for performing the method of claim 6.

18. A computer-readable medium having computer executable instructions for performing the method of claim 11.

19. The method according to claim 1 further comprising storing a representation of the image as it should appear if it is displayed accurately as a recalled representation of the image.

* * * * *